Patented Jan. 14, 1941

UNITED STATES PATENT OFFICE 2,228,561

METHOD FOR THE PURIFICATION OF EXTRACTS CONTAINING THE ADRENAL CORTICAL HORMONE

Alois Detzel, Hamburg, Germany, assignor to the firm: Chemische Fabrik Promonta G. m. b. H., Hamburg, Germany, a company of Germany No Drawing. Application November 4, 1938, Serial No. 238,858. In Germany November 4, 1937

8 Claims. (Cl. 167—74)

Extracts containing the adrenal cortical hormone have to be freed, on the one hand, from the substances of a lipide-like nature present therein in particularly large amounts and, on the other hand, from adrenaline, the oral or parenteral administration of the adrenal cortical hormone being rendered difficult owing to the objectionable taste and poisonous properties of the said compounds.

The known methods for the purification of extracts containing the hormone of the adrenal cortex consists in the selective extraction or fractional precipitation of the extracts by means of organic solvents. These methods are tedious and require large amounts of organic solvents.

The present invention relates to a new, simple and highly efficient method of separating the accompanying lipide-like substances and adrenaline from the adrenal cortical hormone. According to the invention there is produced in the aqueous solutions which contain the hormone of the adrenal cortex, a precipitate of a ferrous compound such as ferrous hydroxide, ferrous carbonate, or ferrous sulphide. This precipitate adsorbs the accompanying lipide-like substances and adrenaline so that in the solution there remains the pure hormone of the adrenal cortex. After the said precipitate has been separated the solution is concentrated if desired. In this manner a highly active preparation of the adrenal cortical hormone is obtained which agrees well with the patient.

It is known to remove albumin from hormone solutions by producing precipitates of ferrous compounds. However, it was not to be expected that also the lipide-like substances and adrenaline which accompany the hormone of the adrenal cortex could be separated therefrom by employing precipitates of ferrous compounds.

In order to obtain the parent solutions which are to be purified by the method according to the invention, the adrenal cortices are extracted with dilute alcohol in the usual manner. Both fresh and powdered dry adrenal cortices can be used for the method; the entire adrenals, fresh or dried, can also be used as parent material for the present method. The dilute alcoholic solutions are freed from alcohol by evaporation in vacuo, whereupon the method of purification according to the invention is applied to the resulting aqueous solutions by producing therein a precipitate of a ferrous compound. Since precipitates of ferrous compounds are soluble in acid solutions, only neutral or weakly alkaline solutions may be used for the method of this invention. The preferred pH range in connection with the present method is pH=7 to 9; sometimes even a somewhat stronger alkaline reaction, such as pH=10, may be employed; however, the risk of injuring the hormone increases with increasing alkalinity.

The most favorable working temperature to be chosen for the method of this invention is room temperature. But slightly increased temperatures, up to about 50° C., can also be employed. At still higher temperatures there is the risk of injuring the hormone.

When the purification according to the invention is effected by producing a precipitate of ferrous carbonate or ferrous phosphate there is formed, according to the pH of the solution, either a neutral or a basic carbonate or phosphate, respectively. When it is desired to free the purified preparations obtained of inorganic salts, the aqueous solutions of the hormone, after having been concentrated if so desired, can be extracted in a manner known per se with organic solvents which are immiscible with water such as benzene, ether, chloroform, dichloroethylene, or ethyl acetate. The hormone passes into the organic solvents while the inorganic salts remain in the aqueous solution.

The invention is illustrated by the following examples:

Example 1

40 kilograms of fresh adrenals are repeatedly extracted with alcohol of 70 per cent strength. The united extracts are evaporated in vacuo at a low temperature to a volume of about 10 litres in order to remove the alcohol. To the concentrated aqueous solution there is added while stirring a concentrated solution of 2 kilograms of ferrous sulphate (green vitriol) whereupon the pH is adjusted to 8.5 to 9.0 by adding calcium, barium, or strontium hydroxide. A voluminous precipitate of ferrous hydroxide is thus produced and carries down all the disturbing substances of a lipide-like nature which accompany the hormone, as well as adrenaline. The precipitate is removed by filtration or centrifuging. The clear filtrate, by means of phosphoric acid, is adjusted to a pH of 6.5. This causes a slight precipitation of calcium, barium, or strontium phosphate, which is discarded. The extract thus obtained is then reduced to the desired volume by evaporation and is suitable, as such, for oral or parenteral administration.

Example 2

10 kilograms of powdered adrenals obtained by drying in vacuo are repeatedly extracted with alcohol of 70 per cent strength. The united extracts are evaporated in vacuo to a volume of about 9 litres. To the aqueous concentrate there is added a concentrated aqueous solution of 1400 grams of ferrous chloride whereupon the pH is adjusted to 8.5 to 9.0 by the addition of caustic soda solution, caustic potash solution, or ammonia. The precipitate of ferrous hydroxide thus produced is removed by filtration or centrifuging, and is discarded. The filtrate is adjusted to a pH of 6.5 by means of phosphoric acid. This causes a precipitate which is filtered off and discarded. The filtrate contains the adrenal cortical hormone free of disturbing lipides and adrenaline. In order to remove dissolved electrolytes from the filtrate, it is repeatedly extracted with benzene in a known manner and the hormone passes into the benzene phase. The united benzene extracts are freed of benzene by evaporation in vacuo. The residue can be dissolved in the desired amount of sodium chloride solution of 0.9 percent or in an analogous isotonic solution that can be used for injections. It agrees well with the patient and is highly active.

Example 3

40 kilograms of fresh adrenal cortices are extracted with alcohol as described in Example 2. After the alcohol has been removed there is added to the aqueous concentrate a concentrated solution of 1000 grams of ferrous chloride whereupon the pH is adjusted to 8.5 to 9.0 by the addition of sodium or potassium carbonate. The precipitate of ferrous carbonate thus produced carries adrenaline and disturbing lipides down from the solution. It is separated by filtration or centrifuging and discarded. The filtrate is adjusted to a pH=6.5 by means of phosphoric acid, and the precipitate formed thereby is filtered off. The filtrate contains the hormone of the adrenal cortex, free of lipides and adrenaline, and can be administered as such orally or parenterally.

Example 4

10 kilograms of powdered adrenals are extracted as described in Example 1. After the alcohol has been evaporated 1350 grams of ferrous sulphate are added to the concentrate whereupon the pH is adjusted to 8.5 to 9.0 by means of sodium phosphate solution. At this pH a substantial precipitate of ferrous phosphate is formed which carries down adrenaline and all the other disturbing substances which accompany the hormone, in the manner described in Examples 1 to 3. The solution is worked up as described in Example 2, the difference being that, in order to obtain the hormone devoid of salts, the aqueous solution of the adrenal cortical hormone after being acidified with phosphoric acid is shaken with ether or chloroform. The hormone passes into the ether or chloroform phase, respectively, and can be obtained therefrom in highly purified form by evaporation.

Example 5

10 kilograms of powdered adrenals are extracted as described in Example 1. After the alcohol has been removed by evaporation in vacuo there are added to the aqueous concentrate 1350 grams of ferrous sulphate and a solution of 1280 grams of sodium sulphide in water. Caustic soda solution is then added if required. The precipitate of ferrous sulphide which is produced carries adrenaline and other disturbing substances of a lipide-like nature down from the solution; it is removed by filtration or centrifuging. Phosphoric acid is then added till the solution shows an acid reaction against litmus, the excess of hydrogen sulphide is removed in the usual manner by passing a current of nitrogen through the solution whereupon the purified solution of the hormone is worked up as described in Examples 1 and 4.

I claim:
1. A method of obtaining the adrenal cortical hormone from aqueous extracts containing said hormone together with impurities of the order of lipide-like substances and adrenaline, which method comprises producing in the aqueous extracts a precipitate on which said impurities are adsorbed by introducing into the extracts a ferrous compound, removing said precipitate together with the impurities adsorbed thereon, extracting the aqueous solutions wtih organic solvents immiscible with water, and evaporating the solvent from the hormone dissolved therein.

2. A method according to claim 1 which comprises using room temperature as the working temperature.

3. A method according to claim 1, which comprises using slightly increased temperatures, up to about 50° C. as the working temperature.

4. A method according to claim 1 which comprises neutralizing the weakly alkaline extracts which contain the adrenal cortical hormone, after the precipitate of ferrous compounds has been separated.

5. A method of obtaining the adrenal cortical hormone from aqueous extracts containing said hormone together with impuriites of the order of lipide-like substances and adrenaline, which method comprises producing in the aqueous extracts a precipitate on which said impurities are adsorbed by introducing into the extracts ferrous hydroxide, removing said precipitate together with the impurities adsorbed thereon, extracting the aqueous solutions with organic solvents immiscible with water, and evaporating the solvent from the hormone dissolved therein.

6. A method of obtaining the adrenal cortical hormone from aqueous extracts containing said hormone together with impurities of the order of lipide-like substances and adrenaline, which method comprises producing in the aqueous extracts a precipitate on which said impurities are adsorbed by introducing into the extracts ferrous carbonate, removing said precipitate together with the impurities adsorbed thereon, extracting the aqueous solutions with organic solvents immiscible with water, and evaporating the solvent from the hormone dissolving therein.

7. A method of obtaining the adrenal cortical hormone from aqueous extracts containing said hormone together with impurities of the order of lipide-like substances and adrenaline, which method comprises producing in the aqueous extracts a precipitate on which said impurities are adsorbed by introducing into the extracts ferrous phosphate, removing said precipitate together with the impurities adsorbed thereon, extracting the aqueous solutions with organic solvents immiscible with water, and evaporating the solvent from the hormone dissolved therein.

8. A method of obtaining a purified adrenal cortical hormone, comprising extracting adrenals with an aqueous solution of alcohol, removing the alcohol from the extract by evaporating under vacuum, removing from the extract impurities of the order of lipide-like substances and adrenaline by introducing a ferrous compound in the extract, said impurities being adsorbed by the resulting precipitate, removing said precipitate together with the impurities adsorbed thereon, extracting the aqueous solutions with organic solvents immiscible with water, and evaporating the solvent from the hormone dissolved therein.

ALOIS DETZEL.